United States Patent [19]

Ueki et al.

[11] 4,441,127
[45] Apr. 3, 1984

[54] TAPE DRIVE DEVICE IN RECORDING AND REPRODUCING DEVICE

[75] Inventors: Yoshiharu Ueki; Shouzaburou Sakaguchi, both of Saitama, Japan

[73] Assignee: Pioneer Electronic Corporation, Tokyo, Japan

[21] Appl. No.: 352,435

[22] Filed: Feb. 25, 1982

[30] Foreign Application Priority Data

Feb. 27, 1981 [JP] Japan ................................ 56-27285

[51] Int. Cl.³ ............................................ G11B 15/18
[52] U.S. Cl. ...................................... 360/71; 360/75; 360/105
[58] Field of Search ........................... 360/71, 75, 105

[56] References Cited

U.S. PATENT DOCUMENTS 4,129,889 12/1978 Ban et al. ............................... 360/75
4,131,922 12/1978 Yoshida et al. ....................... 360/90
4,212,040 7/1980 Yoshida et al. ....................... 360/96.3

Primary Examiner—George G. Stellar
Attorney, Agent, or Firm—Sughrue, Mion, Zinn, Macpeak and Seas

[57] ABSTRACT

A tape drive for a magnetic tape recording and reproducing system. Slackening of the tape is prevented and a stable running tape is assured each time the system is switched to a normal running mode. The take-up reel motor is delayed until the roller which presses the tape against the capstan is in its pressing position and until the magnetic head is pressed against the tape in its record or reproduce position.

6 Claims, 9 Drawing Figures

TAPE DRIVE DEVICE IN RECORDING AND REPRODUCING DEVICE

BACKGROUND OF THE INVENTION

The invention relates to a tape drive device in a recording and reproducing device.

In the case where information is recorded on or reproduced from a magnetic tape in a recording and reproducing device such as a cassette tape recorder, the pinch roller presses the magnetic tape onto the capstan which is rotated at a constant speed so that the magnetic tape is run at a constant speed, and the magnetic head, which is normally retracted, is moved forward to contact the magnetic tape so that information can be recorded or reproduced. Also, the reel motor drives the take-up reel to take up the magnetic tape.

Heretofore, the steps of pressing the pinch roller against the capstan, moving the magnetic head forward and starting the reel motor, are carried out simultaneously in response to a regular speed drive instruction signal. However, since it takes time for the magnetic head to reach the pressing position where the head presses the magnetic tape, the reel motor is started to cause the take-up reel to wind the magnetic tape before the head presses the magnetic tape. As a result, a reproducing start position on the magnetic tape is liable to be displaced from a precisely set position. This is due to the fact that the tape tension is further increased when the head is brought into contact with the magnetic tape under the condition that tension is set up in the magnetic tape by the winding torque of the reel motor. Specifically, the pressing contact of the pinch roller against the capstan is completed before the head is brought into contact with the tape, so that the magnetic tape wound on the supply reel is taken up or pulled by the forward movement of the magnetic head. The reproducing start position on the tape is thus displaced and, in addition, a portion of the magnetic tape which is extended on the side of the supply reel from the magnetic head is slackened. As a result, the back tension on the tape supply side as viewed from the pinch roller and the capstan is considerably decreased, causing the running of the magnetic tape to be unstable.

SUMMARY OF THE INVENTION

An object of this invention is to provide a tape drive device in a recording and reproducing device, in which the slackening of the magnetic tape, which is caused when a magnetic head presses the magnetic tape, is prevented, whereby the magnetic tape is run in a more stable condition.

This and other objects of the invention are provided by a tape drive in a recording and reproducing device having a mechanism for moving a magnetic head to a predetermined position in association with the operation of pressing drive means. A capstan and a pinch roller are pressed against each other to run the magnetic tape at a regular speed. The pressing drive means is started in response to a regular speed drive instruction signal, and a reel motor is started after the lapse of a predetermined time, whereby the magnetic head is caused to press against the tape and the pinch roller is caused to press the capstan, before the take-up reel is started.

DETAILED DESCRIPTION OF A PREFERRED EMBODIMENT

Figure 1:
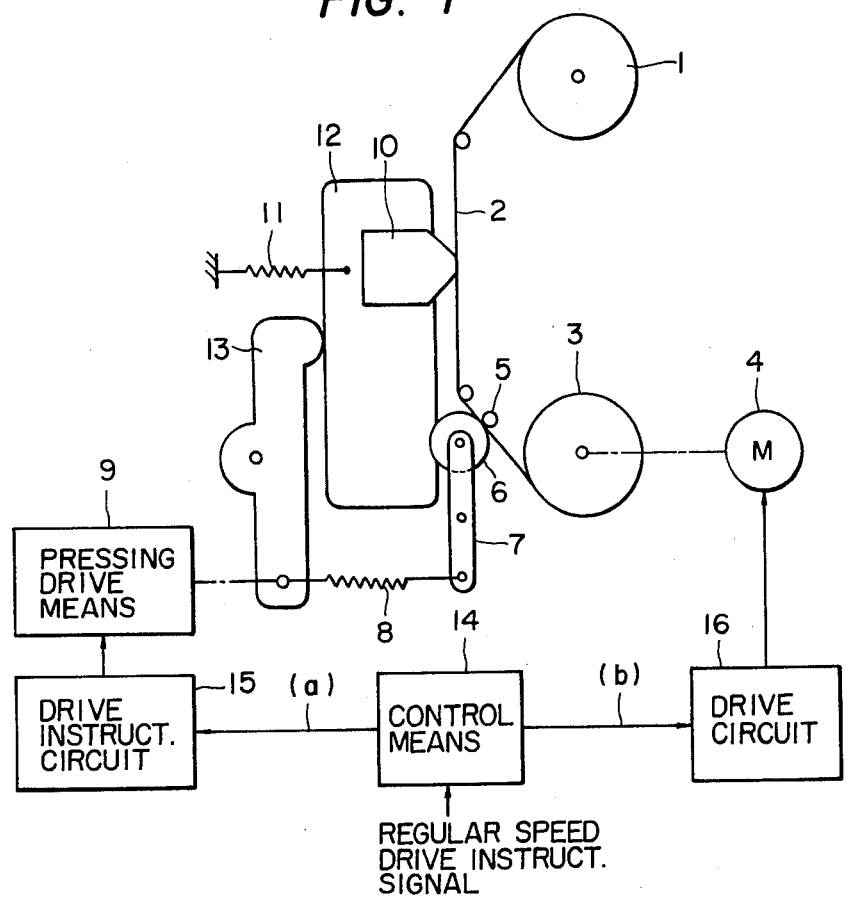
FIG. 1 is an explanatory diagram showing the arrangement of one example of a tape drive device according to the invention.

In FIG. 1, reference numeral 1 designates a supply reel on which a magnetic tape 2 is wound; and 3, a take-up reel for taking up magnetic tape 2. The take-up reel 3 is turned by a reel motor 4. As a pinch roller 6 presses the magnetic tape 2 onto a capstan 5 which is rotated at a constant speed, the magnetic tape 2 is run at a constant speed. The pinch roller 6 is rotatably supported by one end portion of a roller arm 7 which is supported swingably relative to a chassis (not shown). The other end portion of the roller arm 7 is coupled through a spring 8 to a pressing drive means 9 including a plunger. The roller arm 7 is swung by the pressing drive means 9, so that the pinch roller 6 presses the magnetic tape 2 onto the capstan 5 as shown in FIG. 1. The spring 8 is adapted to cause the pinch roller 6 to press the magnetic tape 2 onto the capstan 5 under a predetermined pressure.

In association with the pressing operation of the pinch roller 6 against the capstan 5, a magnetic head 10 is moved forward (to the right-hand side in FIG. 1) to a position where it is pressed against the magnetic tape 2 as shown, so that it can suitably record or reproduce information. The magnetic head 10 is mounted on a head stand 12 which is movable horizontally in FIG. 1 and is urged to the left-hand side in FIG. 1 by a spring 11. The head stand 12 is driven by the pressing drive means 9 through a lever 13 which is pivotally supported so that it is rotatable relative to the chassis, as a result of which the magnetic head 10 is moved forward.

A control means 14 operates to start the pressing drive means 9 in response to a regular speed drive instruction signal which is produced when the system is switched from a stop state or a fast winding state (including a fast rewinding state) to a regular speed running state. The control means 14 also operates to start the reel motor 4 after a predetermined time T has elapsed. In response to the regular speed drive instruction signal, the control means 14 outputs a control signal (a) which is applied to a drive instruction circuit 15 adapted to control the pressing drive means 9. The control means 14 outputs a control signal (b) a predetermined time T after the production of the control signal (a). The control signal (b) is applied to a drive circuit 16 which drives the reel motor 4. The predetermined time T is the time interval which elapses from the instant that the regular speed drive instruction signal is produced until the magnetic head is set at the forward position after the pressing drive means 9 causes the pinch roller 6 to press the magnetic tape against the capstan 5. Thus, the magnetic tape 2 is held between the capstan 5 and the pinch roller 6, and is then pressed against the magnetic head 10 which has been set at the forward position. Thereafter, the magnetic tape 2 is wound on the take-up reel 3.

Figure 2:
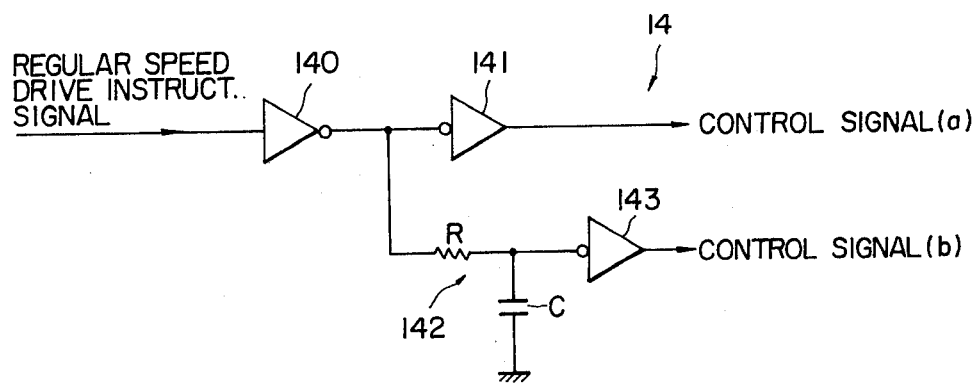
FIG. 2 is a circuit diagram showing one example of control means in FIG. 1.

FIG. 2 is a circuit diagram showing one example of the control means 14. The regular speed drive instruction signal is outputted as the control signal (a) through inverters 140 and 141. The regular speed drive instruction signal is further applied through the inverter 140 to a time constant circuit 142 including a resistor R and a capacitor C, where it is delayed for the above-described predetermined time T, and the signal thus delayed is outputted as the control signal (b) through an inverter 143. The predetermined time T can be varied as required by changing the time constant of the time constant circuit 142.

Figure 3:
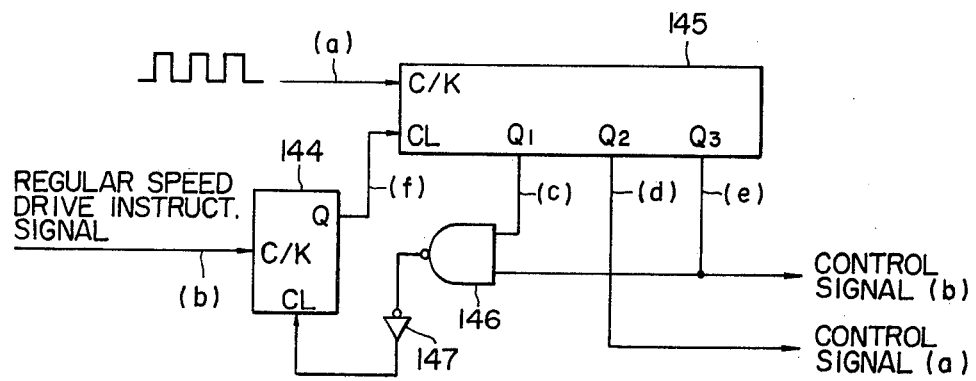
FIG. 3 is a circuit diagram showing another example of the control means in FIG. 1.

FIG. 3 is a circuit diagram showing another example of the control means 14. The control means 14, as shown in FIG. 3, comprises: a flip-flop 144 which receives the regular speed drive instruction signal as a clock input; and a counter 145 which recieves as a clock input clock pulses having a predetermined period and receives as a clear input an output $\overline{Q}$ of the flip-flop 144. Outputs $Q_1$ and $Q_3$ of the counter 145 are applied to a two-input NAND gate 146, the output of which is applied through an inverter 147 to the clear input terminal of the flip-flop 144. The outputs $Q_2$ and $Q_3$ of the counter 145 are employed as the control signals (a) and (b), respectively.

Figure 4A:
FIGS. 4(a)-4(f) are waveform diagrams for a description of the operation of the control means in FIG. 3.
Figure 4B:
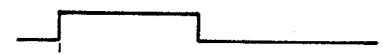
Figure 4C:
Figure 4D:
Figure 4E:
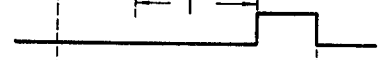
Figure 4F:

FIGS. 4(a)–4(f) show waveforms for a description of the operation of the control means thus organized. FIG. 4(a) shows the clock pulse. FIG. 4(b) shows the regular speed drive signal. FIGS. 4(c)–4(e) show the outputs $Q_1$, $Q_2$ and $Q_3$ of the counter 145, respectively. FIG. 4(f) shows the output Q of the flip-flop 144. As is apparent from FIGS. 4(d) and 4(e), the control signal (b) is produced the predetermined time T after the control signal (a). The predetermined time T can be selected as desired by changing the period of the clock pulse (FIG. 4(e) or the number of stages in the counter 145.

In the above-described embodiment, the control means 14 is designed as an electrical circuit; however, it may be designed as a mechanically arranged one.

As was described above in detail, according to the invention, the magnetic tape is wound on the take-up reel after the pinch roller presses the magnetic tape against the capstan and the magnetic head is pressed onto the magnetic tape. Therefore, the slackening of the tape which is otherwise caused when the magnetic head is pressed onto the magnetic tape is eliminated. Thus, the tape is run stably, and it is possible to positively record or reproduce information beginning from a desired position on the magnetic tape.

What is claimed is:

1. In a magnetic tape recording and/or reproducing device, a tape drive device comprising:
    a reel motor for winding a magnetic tape;
    a capstan and a pinch roller operative, when actuated, for holding and running said magnetic tape at a regular speed;
    pressing drive means for pressing said pinch roller against said capstan under a predetermined pressure;
    a magnetic head which is moved to a predetermined position in association with the operation of said pressing drive means; and
    control means for starting said pressing drive means in response to a regular speed drive instruction signal, and starting said reel motor after the lapse of a predetermined time.

2. In a magnetic tape recording and/or reproducing system a tape drive device comprising:
    a motor adapted to drive a take up reel;
    a capstan, and a pinch roller adapted to press a magnetic tape between said capstan and pinch roller, said capstan being of the type which is adapted to rotate at a constant rate to cause regular running of a magnetic tape pinched between said capstan and said pinch roller, said pinch roller having a first position out of pinching engagement with said capstan and a second position in pinching engagement with said capstan;
    a magnetic head for recording and/or reproducing information on said magnetic tape when pressed against said tape in a record/reproduce position;
    a movable member, on which said magnetic head is mounted, having a first position, where said head is out of said record/reproduce position, and a second position, where said head is in a record/reproduce position; and
    means responsive to a regular speed drive instruct signal for moving said pinch roller and said member to their respective second positions and for starting said motor a predetermined time thereafter to insure that said pinch roller and magnetic head are pressed against said tape prior to starting the take up reel.

3. A magnetic tape recording and/or reproducing system as claimed in claim 2 wherein said last named means comprises:
    pressing drive means operative when actuated for causing said pinch roller and said member to move to their second positions, respectively;
    control means responsive to said regular speed drive instruction signal for generating a first control signal substantially upon receipt of said regular drive instruction signal, and for generating a second control signal at a time T subsequent to the generation of said first control signal, said first control signal being applied to actuate said pressing drive means, and said second control signal being applied to actuate said motor.

4. A magnetic tape recording and/or reproducing system as claimed in claim 3, further comprising;
    a first lever having said pinch roller fixed to a first end therof, a first spring having its first end attached to the second end of said first lever opposite to said pinch roller;
    a second lever having a first end abutting said movable member, and a second end to which the second end of said fixed spring is attached;
    a second spring having one end fixed and the other attached to said movable member, said second spring being biased to pull said movable member into its first position, whereby the abutment of said movable member and said second lever, and the first spring connection between said second and first levers, also causes said pinch roller to be in its first position; and
    wherein said pressing drive means includes means connected to the second end of said second lever and operative when said pressing drive means is actuated to cause said second lever to push against said movable member with a force sufficient to overcome the bias of said second spring whereby a movable member and pinch roller are moved to their second positions, respectively.

5. A magnetic tape recording and/or reproducing system as claimed in any of claims 3 or 4 wherein said control means comprises an RC time constant circuit having a time constant T, and means responsive to said regular speed drive instruct signal for applying an input to said time constant circuit, and means responsive to an output of said time constant circuit for generating said second control signal.

6. A magnetic tape recording and/or reproducing system as claimed in any of claims 3 or 4, wherein said control means comprises:
- a counter for accumulating clock pulses applied thereto when a clear signal is not applied to a clear input thereto;
- a flip-flop for providing a clear signal to said counter when said flip-flop is in its reset state;
- said regular speed drive instruct signal being applied to said flip-flop to cause it to change from a reset to a set state whereby said counter becomes operative to count clock pulses applied thereto;
- first means responsive to a first count in said counter for providing said first control signal;
- second means responsive to a second count in said counter for providing said second control signal;
- said clock pulse period and said first and second counts being selected so that the time between said first and second counts is sufficient to insure that said pinch roller and magnetic head are in their second positions, respectively, before said take-up reel is started.

* * * * *